(12) United States Patent
Frey et al.

(10) Patent No.: US 6,856,067 B2
(45) Date of Patent: Feb. 15, 2005

(54) DEVICE AND METHOD FOR ELECTROSTATICALLY LEVITATING A DISK AND METHOD FOR USING AN ELECTROSTATIC LEVITATED DISK AS A SENSOR

(75) Inventors: Wilhelm Frey, Mountain View, CA (US); Zhiyu Pan, Mountain View, CA (US); Andreas Niendorf, Berlin (DE)

(73) Assignee: Robert Bosch GmbH, Stuttgart (DE)

( * ) Notice: Subject to any disclaimer, the term of this patent is extended or adjusted under 35 U.S.C. 154(b) by 106 days.

(21) Appl. No.: 10/371,809

(22) Filed: Feb. 21, 2003

(65) Prior Publication Data

US 2004/0163471 A1 Aug. 26, 2004

(51) Int. Cl.[7] .................................................. H02N 1/00
(52) U.S. Cl. ...................................... 310/309; 318/116
(58) Field of Search ............................ 310/309; 318/116

(56) References Cited

U.S. PATENT DOCUMENTS

| | | | | |
|---|---|---|---|---|
| 4,789,803 A | * | 12/1988 | Jacobsen et al. ............ | 310/309 |
| 4,943,750 A | * | 7/1990 | Howe et al. ................. | 310/309 |
| 5,015,906 A | * | 5/1991 | Cho et al. .................... | 310/309 |
| 5,187,399 A | * | 2/1993 | Carr et al. ............ | 310/40 MM |
| 5,604,392 A | * | 2/1997 | Vig .............................. | 310/309 |
| 5,789,843 A | * | 8/1998 | Higuchi et al. ............. | 310/309 |
| 5,955,800 A | * | 9/1999 | Shearwood et al. .. | 310/40 MM |
| 6,525,446 B1 | * | 2/2003 | Yasuda et al. .............. | 310/309 |

OTHER PUBLICATIONS

Shao Jü Woo et al., Hysteretic Feedback Control of Electrostatic Levitator for Objects Possessing Large Suspension Area–Airgap Ratio Jan. 21, 2003.

Michael Kraft et al., System Level Simulatio of an Electrostatically Levitated Disk, Univ. of Southampton, UK. Jan. 21, 2003.

* cited by examiner

*Primary Examiner*—Karl Tamai
(74) *Attorney, Agent, or Firm*—Kenyon & Kenyon

(57) ABSTRACT

A device for levitating a disk including three bottom electrodes situated below the disk and equidistantly around a top circle and three top electrodes situated above the disk, opposite the three bottom electrodes, and situated equidistantly around a bottom circle. Two bottom reference electrodes are situated below the disk, a first bottom reference electrode forming a bottom inner circle on a bottom inner perimeter of the set of three bottom electrodes, a second bottom reference electrode forming a bottom outer circle on a bottom outer perimeter of the set of three bottom electrodes. Two top reference electrodes are situated above the disk, a first top reference electrode forming a top inner circle on a top inner perimeter of the set of three top electrodes, a second top reference electrode forming a top outer circle on a top outer perimeter of the set of three top electrodes. A drive circuit for driving the three bottom electrodes, the three top electrodes, the two bottom reference electrodes, and the two top reference electrodes. A method of levitating a disk includes applying a first plurality of voltages to three bottom electrodes situated below the disk. A second plurality of voltages is applied to three top electrodes situated above the disk and opposite the three bottom electrodes. A third plurality of voltages is applied to two bottom reference electrodes situated below the disk. A fourth plurality of voltages is applied to two top reference electrodes situated above the disk. A fifth plurality of voltages may be applied to side electrodes to rotate the disk.

30 Claims, 7 Drawing Sheets

DEVICE AND METHOD FOR ELECTROSTATICALLY LEVITATING A DISK AND METHOD FOR USING AN ELECTROSTATIC LEVITATED DISK AS A SENSOR

FIELD OF THE INVENTION

The present invention generally regards the field of sensors. More particularly, the present invention regards a device and method of electrostatically levitating a disk and for using an electrostatic levitated disk as an accelerometer, an angular accelerometer, an angular velocity sensor, and/or a tilt sensor.

BACKGROUND INFORMATION

Electrostatic forces have been used to levitate objects. Shao Ju Woo, Jong Up Jeon, Toshiro Higuchi, and Andreas Stemmer discuss in their article "Hysteretic Feedback Control of Electrostatic Levitator for Objects Possessing Large Suspension Area-Airgap Ratio" the electrostatic levitation of 4-inch silicon wafers utilizing a one degree of freedom electrostatic levitator.

Michael Kraft, et. al., of the University of Southampton discuss in their article "System Level Simulation of an Electrostatically Levitated Disk" (hereinafter Kraft) simulating the levitation of a micromachined disk by using sigma delta feedback control. Kraft discusses using a middle electrode, which is surrounded by four additional electrodes, to control pitch and tilt. The set of electrodes is above and beneath the disk; therefore, there is the need for up to eight control circuits. Kraft measures the distance of the disk. When the disk leaves a designated position, the maximum force is switched on. This will cause the disk to return to the designated position. Since the maximum force is switched on, the disk will leave the designated position moving in the opposite direction. This will cause the opposite voltage to switch on to force the disk to return to designated position under the influence of a force opposing the first force. Therefore, the disk will always receive high force impulses and the mass of the disk is used to hold the movement of the disk low. The mass of the disk may be 1000 ug. In Kraft, if an external force is applied to the disk (acceleration) the frequencies of the force peaks will change, and this is used to measure the external force.

Tokimec, Inc. discusses in "Inertia Sensor Performing Measurement with Rotor Levitating in Vacuum" (hereinafter Tokimec) a sensor which is able to measure the angular rate and acceleration. The Tokimec sensor is a free-floating rotational disk made out of Pyrex glass.

However, there is a need for a micromechanical device for measuring acceleration, angular acceleration, angular velocity, and/or tilt using an electrostatic levitated disk, with a minimum amount of control circuitry.

SUMMARY OF THE INVENTION

A device for levitating a disk is provided including three bottom electrodes situated below the disk and situated equidistantly around a top circle. Three top electrodes are provided situated above the disk, opposite the three bottom electrodes, and equidistantly around a bottom circle. Two bottom reference electrodes are situated below the disk. A first bottom reference electrode forms a bottom inner circle on a bottom inner perimeter of the set of three bottom electrodes. A second bottom reference electrode forms a bottom outer circle on a bottom outer perimeter of the set of three bottom electrodes. Two top reference electrodes are situated above the disk. A first top reference electrode forms a top inner circle on a top inner perimeter of the set of three top electrodes. A second top reference electrode forms a top outer circle on a top outer perimeter of the set of three top electrodes. A drive circuit drives the three bottom electrodes, the three top electrodes, the two bottom reference electrodes, and the two top reference electrodes.

A method of levitating a disk includes applying a first plurality of voltages to three bottom electrodes situated below the disk. The three bottom electrodes are situated equidistantly around a top circle. A second plurality of voltages is applied to three top electrodes situated above the disk and opposite the three bottom electrodes. The three top electrodes are situated equidistantly around a bottom circle. A third plurality of voltages is applied to two bottom reference electrodes situated below the disk. A first bottom reference electrode forms a bottom inner circle on a bottom inner perimeter of the set of three bottom electrodes and a second bottom reference electrode forming a bottom outer circle on a bottom outer perimeter of the set of three bottom electrodes. A fourth plurality of voltages is applied to two top reference electrodes situated above the disk. A first top reference electrode forms a top inner circle on a top inner perimeter of the set of three top electrodes and a second top reference electrode forms a top outer circle on a top outer perimeter of the set of three top electrodes.

A system for levitating a disk is provided including a first electrode situated below the disk, a second electrode situated above the disk and opposite the first electrode, a third electrode situated below the disk, a fourth electrode situated above the disk and opposite the third electrode, a fifth electrode situated below the disk, and a sixth electrode situated above the disk and opposite the fifth electrode. A bottom outer reference electrode is situated below the disk and outside an outer perimeter formed by the first electrode, the third electrode, and the fifth electrode. A bottom inner reference electrode is situated below the disk and inside an inner perimeter formed by the first electrode, the third electrode, and the fifth electrode. A top outer reference electrode is situated above the disk and outside an outer perimeter formed by the second electrode, the fourth electrode, and the sixth electrode. A top inner reference electrode is situated above the disk and inside an inner perimeter formed by the second electrode, the fourth electrode, and the sixth electrode. At least one drive circuit is electrically coupled to the first electrode, the second electrode, the third electrode, the fourth electrode, the fifth electrode, and the sixth electrode. The at least one drive circuit applies a plurality of voltages. The disk includes at least one of a dielectric material and a semiconductor material, and is about planar and about circular.

DETAILED DESCRIPTION

Figure 1:
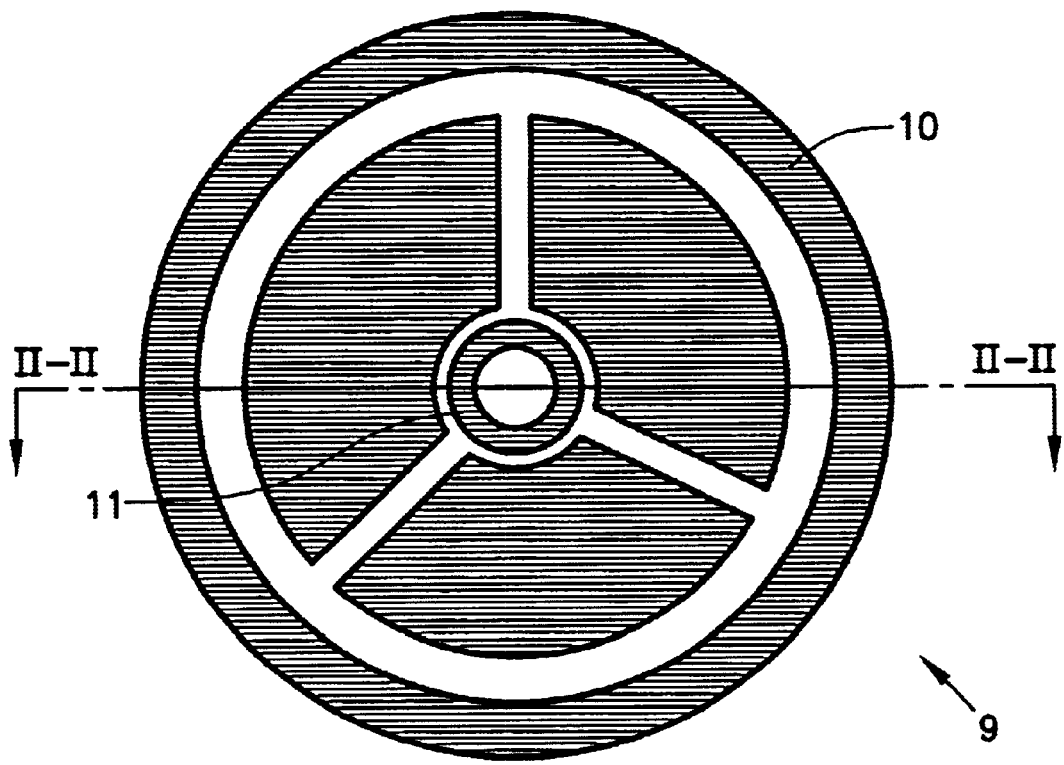
FIG. 1 is a plan view of the top electrode configuration of an exemplary embodiment of the present invention.

An exemplary embodiment of the invention may include several features including simplified circuitry and simplified construction. An exemplary embodiment may use a surface micromachining process which may reduce costs and may increase performance. FIG. 1 is a plan view of top electrode configuration 9 of an exemplary embodiment of the present invention. FIG. 1 shows outer top reference electrode 10 defining the outer perimeter of a circle. Top electrodes 12, 13, 14 collectively define a circle within the inside radius of outer top reference electrode 10. Each of top electrodes 12, 13, 14 defines a 120 degree angle, although alternative configurations in which each electrode defines an angle greater or less than 120 degrees may be possible. The electrodes may be symmetrical in order that the levitation force is balanced. Three symmetrical electrodes each occupying 60 degrees of arc separated from each other by another 60 degrees of arc is one alternative possible configuration.

Inner top electrode 11 lies radially inward from top electrodes 12, 13, 14. Top electrode configuration 9 includes all of outer top electrode 10, inner top electrode 11, and top electrodes 12, 13, 14. Each of outer top electrode 10, inner top electrode 11, and top electrodes 12, 13, 14 is separated from the other electrodes by an airgap, a layer, and/or a film which may be composed of dielectric and/or semiconductor material. Therefore, each of outer top electrode 10, inner top electrode 11, and top electrodes 12, 13, 14 may be electrically isolated.

Figure 2:
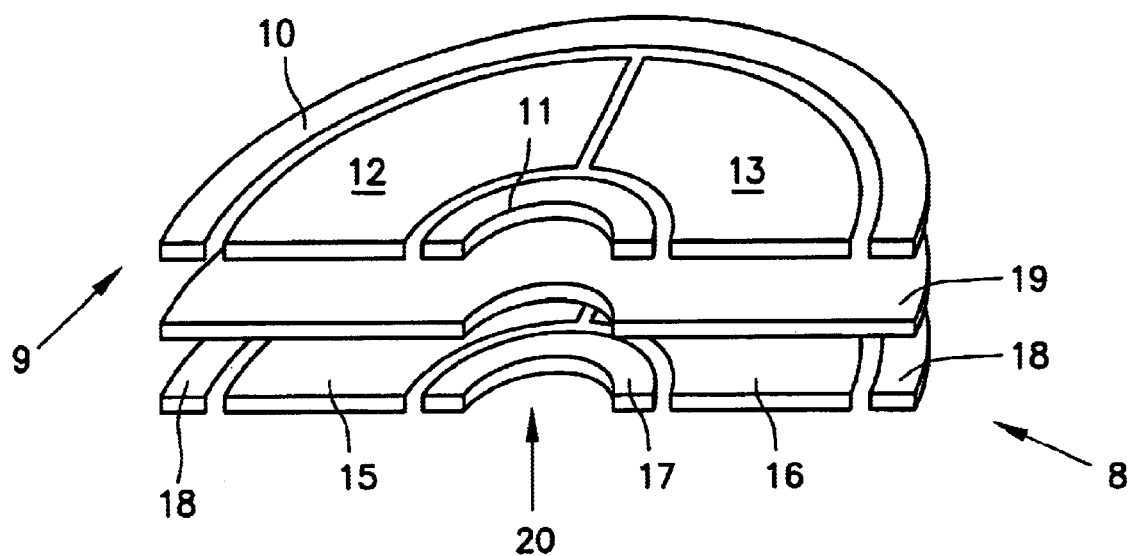
FIG. 2 is an elevated cross section view of the exemplary embodiment shown in FIG. 1 taken along line II—II showing the top and bottom electrode configurations and the levitating disk.

FIG. 2 is a slightly elevated cross section view of the exemplary embodiment shown in FIG. 1 taken along line II—II and showing top electrode configuration 9, bottom electrode configuration 8, and levitating disk 19. FIG. 2 shows outer top electrode 10, inner top electrode 11, and top electrodes 12, 13. Mirroring these top electrodes are outer bottom electrode 18, inner bottom electrode 17, and bottom electrodes 15, 16. Hole 20 lies at the center of levitating disk 19. A surface MEMS process may be used to produce levitating disk 19. Levitating disk 19 may be made of any appropriate material. Levitating disk 19 may be produced by MEMS means, and may include Si, SiGe, SiC, a polymer, or any other material. Outer top electrode 10, inner top electrode 11, top electrodes 12, 13, outer bottom electrode 18, inner bottom electrode 17, and bottom electrodes 15, 16 may have low resistance, and the surface may include a conductive layer, for instance a small deposit of metal or doped semiconductor material.

Figure 3:
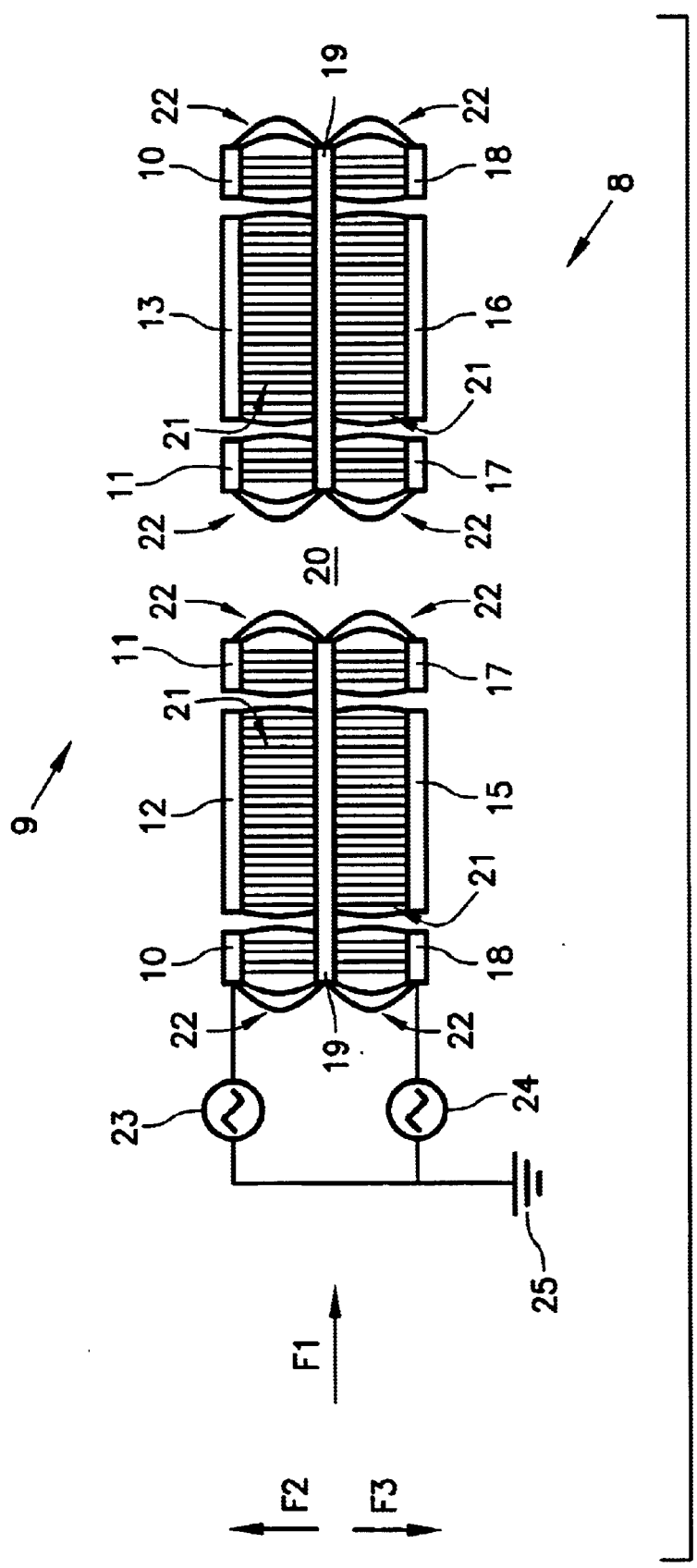
FIG. 3 is an edge view schematic diagram of the cross section shown in FIG. 2 showing the field lines, force lines, and showing circuitry for the reference electrodes.

FIG. 3 is an edge view schematic diagram of the cross section shown in FIG. 2 showing central electrostatic field 21, fringe electrostatic field 22, force line arrows F1, F2, F3, top electrode configuration 9, bottom electrode configuration 8, and levitating disk 19. The sideward movement in the direction of force line arrow F1 may be restricted by the effect of the bowing of fringe electrostatic field 22. As is shown in FIG. 3, fringe electrostatic field 22 bows out from the outer edge between outer top electrode 10 and levitating disk 19, and out from the outer edge between outer bottom electrode 18 and levitating disk 19. The effect of the bowing of fringe electrostatic field 22 may have a stabilizing effect on the forces on levitating disk 19 in the direction of force line arrow F1 and in a direction opposite to force line arrow F1.

The voltages applied to 12, 13, 15, and 16 may be a high frequency alternating voltage. This high frequency alternating voltage may vary continuously, as a sinusoid function, or may vary as a rectangular step function. Both the frequency and the maximum voltage may vary to induce the levitation and counteract the external forces on levitating disk 19. Sinusoidal high frequency generators 23 and 24 may be driven by a high frequency signal, which may have a phase shift of 180 degrees. The use of a high frequency signal to hold levitating disk 19 horizontally may allow cancellation of forces perpendicular to levitating disk 19, making regulation of levitating disk 19 position easier. By using a high frequency signal, central electrostatic field 21 and fringe electrostatic field 22 may generate forces in the direction of force line arrows F1, F2, and F3. Force line arrows F2 and F3 may cancel each other out, whether levitating disk 19 is in a central position or not. Force line arrow F1 may depend on the lateral position of levitating disk 19 relative to top electrode configuration 9 and bottom electrode configuration 8. Force line arrow F1 may act on both sides of levitating disk 19 and the resulting component may hold levitating disk 19 in a stable horizontal position. The usage of the inner electrodes 11, 17 could increase the horizontal stability of the levitated disk. The use of two reference electrodes and three driving electrodes on each side may reduce the number of control circuits necessary to induce stable levitation of levitating disk 19.

Analog driving signals may be used, in the form of a delta sigma controller, where the driving voltages may be periodically switched on and off, applying periodically the maximum force in the opposite direction. The inertia of the mass of levitating disk 19 may be used to average the forces over time. For surface micromachined disks the mass may be so small that high frequencies may be necessary to suppress the vibration due to the alternating forces, and may require a frequency higher than about 50 MHz.

The electric potential between the top and bottom electrodes may be high frequency AC voltage. The voltage may vary continuously as a sinusoid signal, or may alternatively be a rectangular signal. This voltage may only change if it is necessary to counteract external forces, e.g. due to acceleration. The value of the voltage may be used to extract a measurement signal to determine if any increase or decrease in the voltage is necessary to maintain levitating disk 19 in a position of equilibrium. This may make it possible to control, and therefore measure, several degrees of freedom of levitating disk 19.

Outer bottom electrode 18, outer top electrode 10, inner top electrode 11, and inner bottom electrode 17 may have an HF voltage, with the voltage in each electrode phase shifted by 180 degrees with respect to each other. Since the alternating current has a 180 degree phase shift with respect to the other, a high frequency current may flow between outer bottom electrode 18 and outer top electrode 10 and/or between inner top electrode 11 and inner bottom electrode 17. This current may establish fringe electrostatic field 22 shown in FIG. 3. Fringe electrostatic field 22 may not influence levitating disk 19 with respect to the levitation. Two forces, F2 and F3, may act on levitating disk 19. F2 and F3 may depend on the voltage between levitating disk 19 and outer top electrode 10, inner top electrode 11, outer bottom electrode 18, and inner bottom electrode 17. This voltage may depend linearly on the gap between levitating disk 19 and outer top electrode 10, inner top electrode 11, outer bottom electrode 18, and inner bottom electrode 17. A bigger gap may indicate a lower electrical field which leads to a smaller electrical force. The resulting force may be approximately the inverse of the gap squared. Therefore, the forces F2 and F3 may null each other. Fringe electrostatic field 22 may maintain levitating disk 19 horizontally in place, since the symmetries of fringe electrostatic field 22 may be destroyed if levitating disk 19 moves out of the field (in the direction of F1). Therefore, the voltages at outer bottom electrode 18, outer top electrode 10, inner top electrode 11, and inner bottom electrode 17 may be HF with a 180 degree phase shift.

Figure 4:
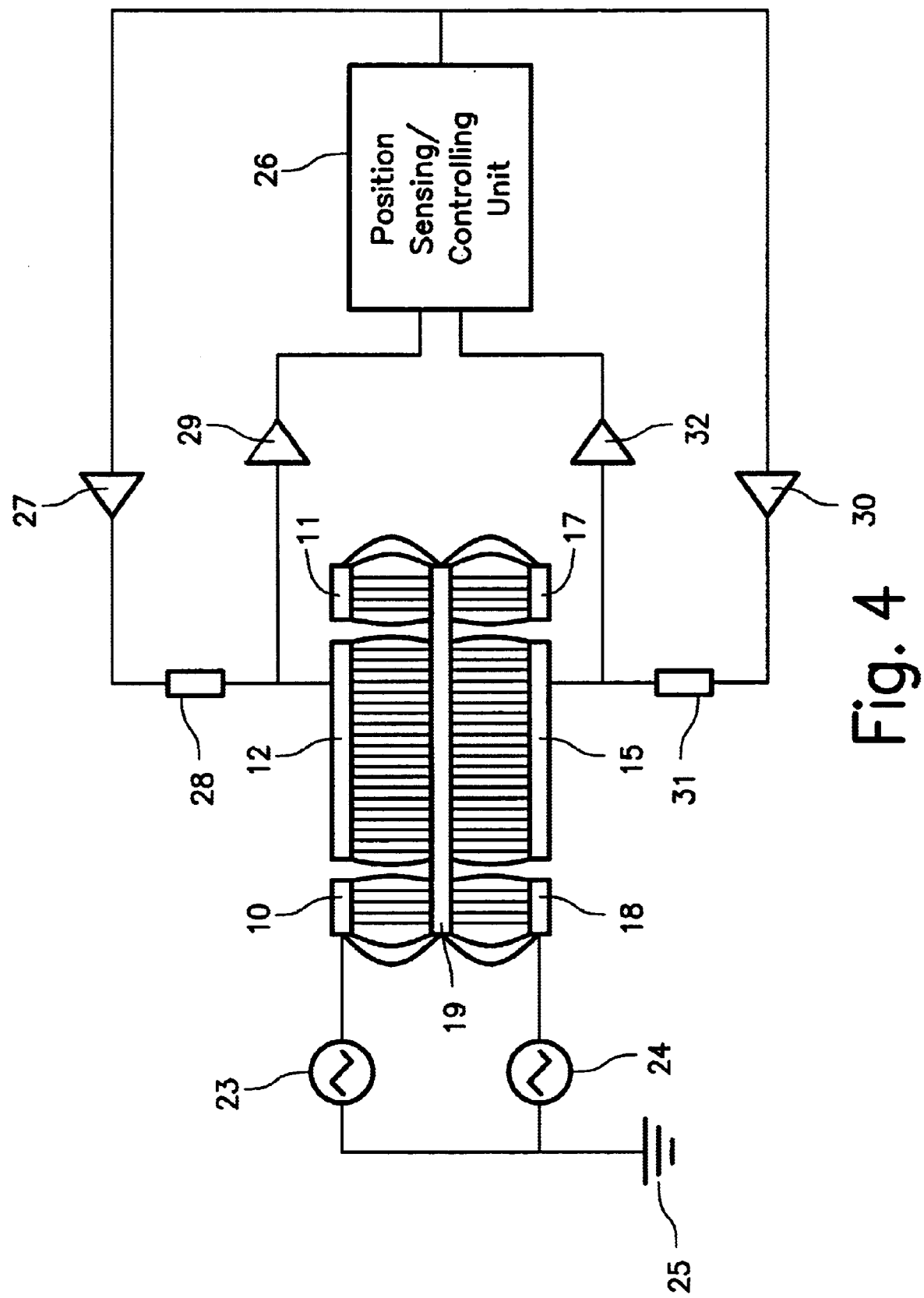
FIG. 4 is a schematic diagram of one half of the schematic diagram shown in FIG. 3 and showing circuitry for controlling the electrodes.

FIG. 4 illustrates the arrangement for outer top electrode 10, inner top electrode 11, top electrode 12, outer bottom electrode 18, inner bottom electrode 17, and bottom electrode 15 in relation to levitating disk 19. FIG. 4 is a schematic diagram of one half of the schematic diagram shown in FIG. 3 and shows circuitry controlling the electrodes. To measure yaw rate, levitating disk 19 may need to be set rotating. By rotating levitating disk 19, additional movement of levitating disk 19 may be induced due to the gyroscopic principle. Rotation may be accomplished by applying a rotating signal to the electrodes of the top electrode configuration (including top electrode 12) and the electrodes of the bottom electrode configuration (including bottom electrode 15). The electrodes of the top electrode configuration may be paired with the electrodes of the bottom configuration. Each top electrode may be paired with the bottom electrode which is situated opposite the top electrode. In this manner, the electrodes may be divided into 3 pairs. The input signal of the 3 pairs may be the same sinusoid signal, but with each signal shifted by 120-degree with the adjacent electrodes. One electrode may lead by 120 degrees while the other adjacent electrode may lag by 120 degrees. Referring to FIG. 1, top electrode 12 may lead top electrode 13 by 120 degrees, while top electrode 12 may lag top electrode 14. The corresponding bottom electrodes may be driven by voltages having a similar phase relationship. The voltage signals may all be sinusoidal and may be of equal strength. This voltage pattern may generate a dragging force, which may initiate and/or maintain a rotation of levitating disk 19. In this manner, the induced rotation of the system may operate on a principle similar to that of a step motor and/or a three-phase induction motors.

Also shown in FIG. 4 is position sensing/controlling unit 26, which may be connected to top electrode 12 by voltage regulator 27 and resistor unit 28. Also connected to top electrode 12 may be feedback current measuring unit 29, which may also be connected to position sensing/controlling unit 26. This may function as a feedback loop, allowing position sensing/controlling unit to determine the distance between top electrode 12 and levitating disk 19 and to thereby adjust the voltage applied to voltage regulator 27. Similarly, position sensing/controlling unit 26 may be connected to bottom electrode 15 by voltage regulator 30, which may be an inverter, and resistor unit 28. The inversion function of voltage regulator 30 may shift the high frequency alternating current by 180 degrees. Also connected to bottom electrode 15 may be feedback current measuring unit 32, which may also be connected to position sensing/controlling unit 26. This may also function as a feedback loop, allowing position sensing/controlling unit to determine the distance between top electrode 12 and levitating disk 19 and to thereby adjust the voltage applied to voltage regulator 30. Outer top electrode 10, inner top electrode 11, inner bottom electrode 17, and outer bottom electrode 18 may all be reference electrodes which may include separate ground connections or may have a common ground. In alternative exemplary embodiments, voltage regulator 27 and voltage regulator 30 may be current regulators, and feedback current measuring unit 29 and feedback current measuring unit 32 may be feedback voltage measuring units.

In an exemplary embodiment, each of three top electrodes 12, 13, 14 and two bottom electrodes 15, 16, and a bottom electrode in the foreground may have a drive circuit similar to that described above and also connected to the same or a different position sensing/controlling unit 26. Therefore, there may be six drive circuits connected to position sensing/controlling unit 26. In an alternative exemplary embodiment, outer top electrode 10, inner top electrode 11, outer bottom electrode 18, and/or inner bottom electrode 17 (collectively known as the reference electrodes) may each have a dedicated drive circuitry for providing the high frequency voltage or may have a common drive circuitry. Additionally, the drive circuitry for the reference electrodes may or may not be connected to position sensing/controlling unit 26.

The HF may be lead through top electrode 12 and bottom electrode 15, resulting in two HF currents (the current flowing through feedback current measuring unit 29 and the current flowing through feedback current measuring unit 32 in FIG. 4), where the difference of this currents will correspond to the position of levitating disk 19. A smaller and thinner levitating disk 19 may be possible with an exemplary embodiment of the present invention. Levitating disk 19 may have a low mass. Therefore, it may be preferable to have very high frequencies to reduce vibrations on the small mass of levitating disk 19.

In another exemplary embodiment, a DC voltage may be used to keep levitating disk 19 in position. The DC voltage may only change if it is necessary, for instance to counteract an external force. For this purpose, the DC voltage may have to change quickly. In another exemplary embodiment, a fixed frequency may be used and the amplitude of the voltage may be varied. In this case for example, a high frequency of about 500 MHz may be used to detect the position of levitating disk 19. A frequency of about 1 GHz may be used to drive top electrode 12 and bottom electrode 15 using voltage regulator 27 and voltage regulator 30. The amplitude of the voltages generated by voltage regulator 27 and voltage regulator 30 may then be responsible for the resulting force.

A frequency of about 1 GHz may be used to measure the position with respect to outer top electrode 10, inner top electrode 11, outer bottom electrode 18, and/or inner bottom electrode 17. A small voltage of 50 MHz may be applied to levitating disk 19 using voltage regulator 27 and/or voltage regulator 30, with a phase shift of 180 degrees. This may cause levitating disk 19 to vibrate at a frequency of 50 MHz. This movement may modulate the currents flowing through feedback current measuring unit 29 and/or feedback current measuring unit 32. After demodulation of the currents flowing through feedback current measuring unit 29 and/or feedback current measuring unit 32, the difference of the currents may contain the position information. This information may be used to generate the necessary force to keep the levitating disk 19 in place by driving levitating disk 19 by: increasing the amplitude of the 1 GHz, the 50 MHz, or another frequency (possibly depending on the direction of force); superimposing another voltage at another frequency on any existing HF voltage; and/or superimposing an additional DC voltage. Alternative exemplary embodiments may use variations on the frequency and strength of the voltages and the weight and configuration of levitating disk 19 in order to enable a stable and reliable system. The voltages applied to outer top electrode 10, inner top electrode 11, outer bottom electrode 18, and/or inner bottom electrode 17 may be a HF reference voltage and may generate the levitating force.

Figure 5:
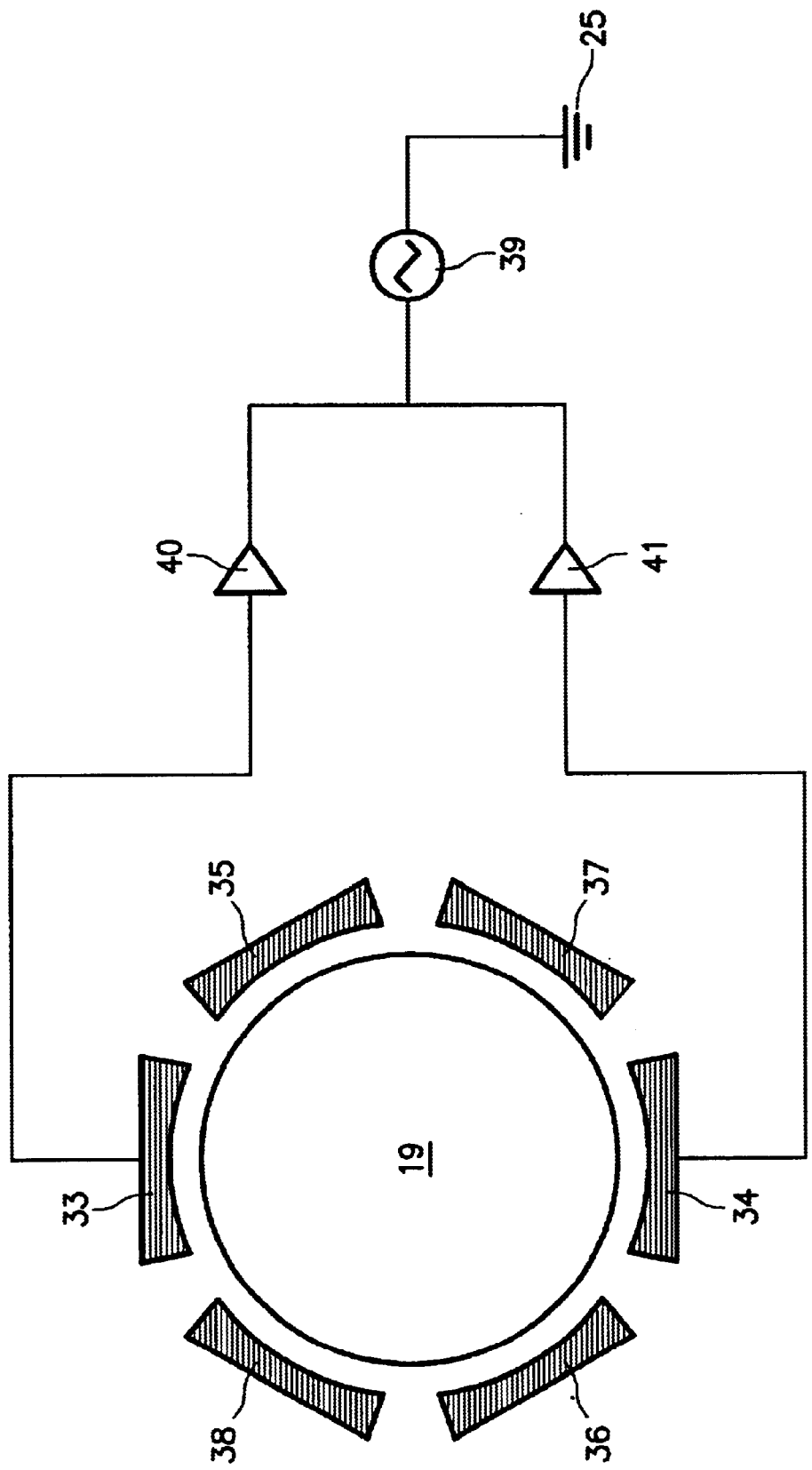
FIG. 5 is a schematic diagram showing a plan view of an exemplary embodiment of the present invention with side electrodes for inducing rotation and the circuitry for controlling one pair of side electrodes.

FIG. 5 is a schematic diagram showing a plan view of an exemplary embodiment of the present invention including side electrodes 33, 34, 35, 36, 37, and 38 for inducing rotation in levitating disk 19 and electric circuitry for controlling the pair of side electrodes 33 and 34. Placing side electrodes 33, 34, 35, 36, 37, and 38 around the outside of levitating disk 19 may avoid problems associated with differences in the rotation speed of levitating disk 19 and the applied electrical field. Additionally, using side electrodes 33, 34, 35, 36, 37, and 38 to induce rotation may avoid the problem of the variation of the field voltage leading to additional out-of-plane forces, which may lead to unstable rotation, e.g. rolling. Controlling side electrodes 33 and 34 may be circuitry including voltage regulators 40 and 41, high frequency voltage signal generator 39, and ground 25. Voltage regulator 41 may function as an inverter with respect to voltage regulator 40, causing the voltage applied to side electrode 34 to lead (or alternatively to lag) the sinusoidal voltage applied to side electrode 33 via voltage regulator 40 by 180 degrees. Alternatively, voltage regulator 41 may induce a different lead or lag in the voltage applied to side electrode 34. Side electrode 35 may be similarly matched with side electrode 36 with a similar set of voltage regulators providing the same or a different lead/lag relationship, and may be connected to the same high frequency voltage signal generator 39, or alternatively to a different high frequency voltage signal generator. Similarly, side electrodes 37 and 38 may be matched and driven in the same or in a different manner to provide a rotational force on levitated disk 19. Alternative electrode configurations, including more or fewer electrodes, arranged in matching sets or singly, are possible.

Figure 6:
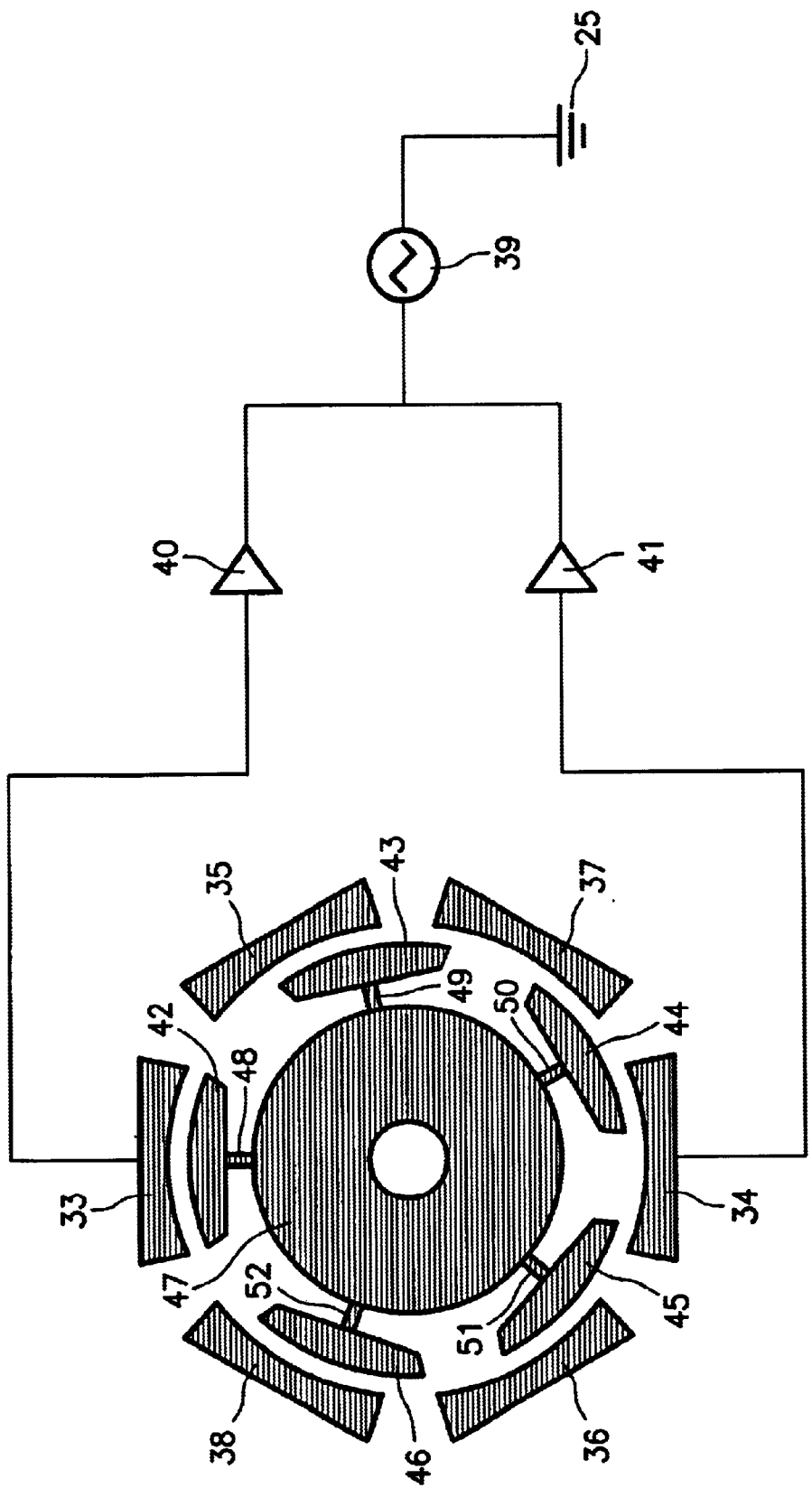
FIG. 6 is a schematic diagram showing a plan view of an exemplary embodiment of the present invention with side electrodes for inducing rotation and the circuitry for controlling one pair of side electrodes and showing a design for a disk component for cooperating with the side electrodes to induce disk rotation.

FIG. 6 is a schematic diagram showing a plan view of an exemplary embodiment of the present invention with side electrodes 33, 34, 35, 36, 37, and 38 for inducing rotation and electric circuitry for controlling one pair of side electrodes 33 and 34. Also shown in FIG. 6 is an alternative exemplary embodiment of a levitating disk 19. Levitating disk 19 is for cooperating with side electrodes 33, 34, 35, 36, 37, and 38 for inducing levitating disk 19 to rotate. The use of a high frequency signal to drive side electrodes 33, 34, 35, 36, 37, and 38 may allow stable rotation and control of the rotation speed, which may result in greater control of, and/or sensitivity to, the gyroscopic effect. A rotating disk may be used for yaw rate measurements. Unwanted forces may be nulled by using high frequency driving signals with a phase shift of 180 degrees. With a specific design, the movement of levitating disk 19 may be stepped, resulting in precise control of the rotation speed of levitating disk 19. The sensitivity of the sensor may be adjusted by changing the rotation speed. Levitating disk 19 may be free and extensions 42, 43, 44, 45, 46 may be attached directly to levitating disk 19 by beams 48, 49, 50, 51, 52. Levitating disk 19 may include central disk region 47 as well as side interactors 42, 43, 44, 45, and 46. These side interactors may be composed of the same material as central disk region 47 or a different material. Beams 48, 49, 50, 51, 52 may enable the field for rotating the disk to avoid interference with the field for levitating the disk and the field for maintaining the horizontal position of the disk. Levitating disk 19 may be directly between outer top electrode 10, inner top electrode 11, outer bottom electrode 18, and/or inner bottom electrode 17, (shown in FIG. 3) and extensions 42, 43, 44, 45, 46 may extend outward, as viewed from above, of outer top electrode 10, inner top electrode 11, outer bottom electrode 18, and/or inner bottom electrode 17.

Figure 7:
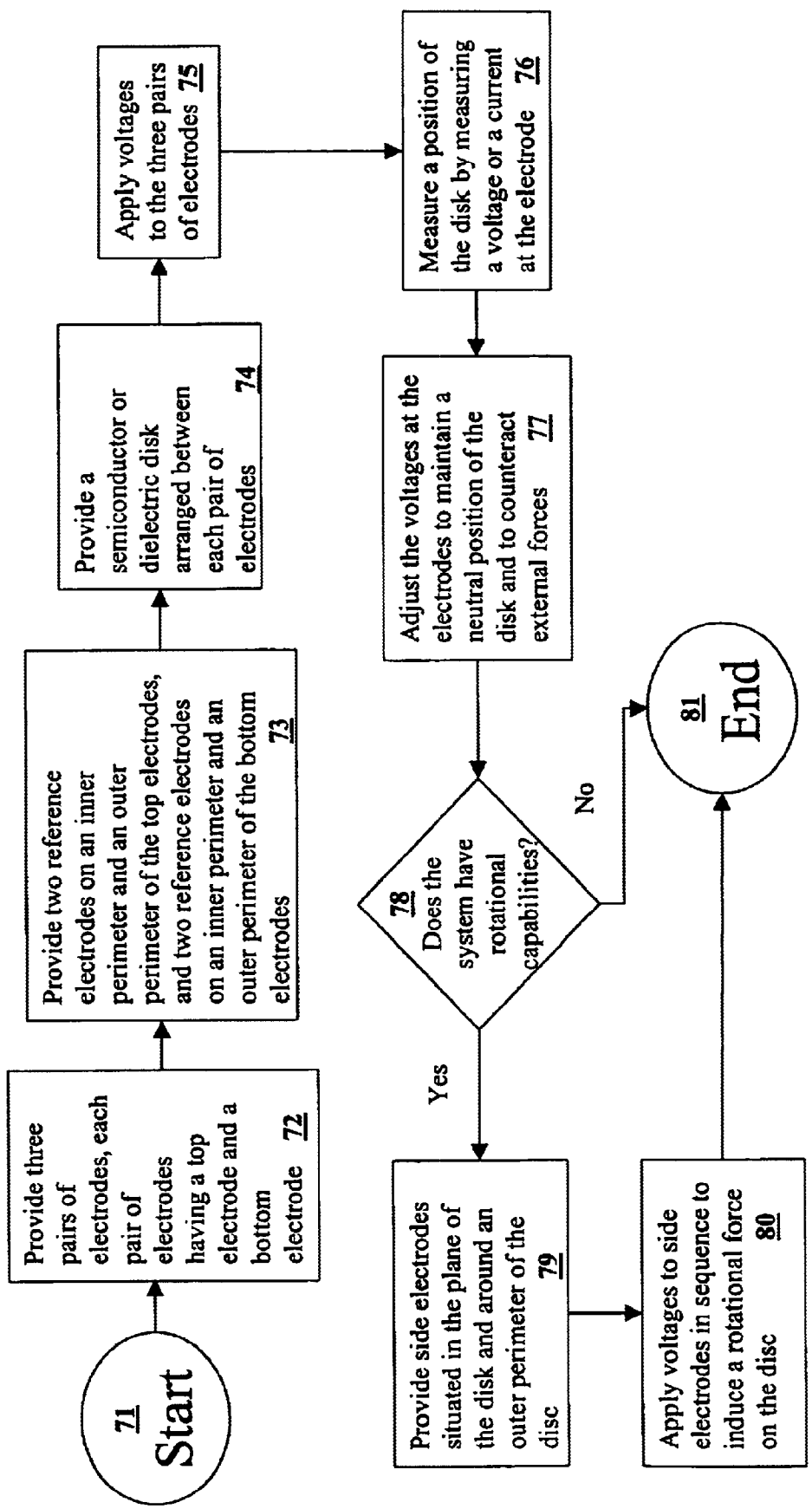
FIG. 7 is a flowchart illustrating an exemplary method for levitating and rotating a disk.

FIG. 7 is a flowchart illustrating an exemplary method for levitating and rotating a disk. The exemplary method starts in Circle 71 and proceeds to Action 72 in which three pairs of electrodes are provided, each pair of electrodes having a top electrode and a bottom electrode. From Action 72, the flow proceeds to Action 73, where two reference electrodes are provided on an inner perimeter and an outer perimeter of the top electrodes, and two reference electrodes are provided on an inner perimeter and an outer perimeter of the bottom electrodes. From Action 73, the flow proceeds to Action 74, a semiconductor or dielectric disk is arranged between each pair of electrodes. From Action 74, the flow proceeds to Action 75, where voltages are applied to the three pairs of electrodes. From Action 75, the flow proceeds to Action 76, where a position of the disk is measured by measuring a voltage or a current at the electrode. From Action 76, the flow proceeds to Action 77, where the voltages are adjusted at the electrodes to maintain a neutral position of the disk and to counteract external forces. From Action 77, the flow proceeds to Decision 78, where the query is posed whether the system has rotational capabilities. If the response to the query of Decision 78, is in the affirmative, the flow proceeds to Action 79, where side electrodes are provided situated in the plane of the disk and around an outer perimeter of the disk. From Action 79, the flow proceeds to Action 80, where voltages are applied to the side electrodes in sequence to induce a rotational force on the disk. From Action 80, the flow proceeds to Endpoint 81. If the response to the query of Decision 78, is in the negative, the flow proceeds to Endpoint 81.

A device and method of electrostatically levitating a disk and for using an electrostatic levitated disk as an accelerometer, an angular accelerometer, an angular velocity sensor, and/or a tilt sensor is provided herein. While several embodiments have been discussed, others, within the invention's spirit and scope, are also plausible.

What is claimed is:

1. A device for levitating a disk, comprising:
   three bottom electrodes situated below the disk, the three bottom electrodes situated equidistantly around a bottom circle;
   three top electrodes situated above the disk and opposite the three bottom electrodes, the three top electrodes situated equidistantly around a top circle;
   two bottom reference electrodes situated below the disk, a first bottom reference electrode forming a bottom inner circle radially inwards of the set of three bottom electrodes, a second bottom reference electrode forming a bottom outer circle radially outwards of the set of three bottom electrodes;
   two top reference electrodes situated above the disk, a first top reference electrode forming a top inner circle radially inwards of the set of three top electrodes, a second top reference electrode forming a top outer circle radially outwards of the set of three top electrodes; and
   at least one drive circuit for driving the three bottom electrodes, the three top electrodes, the two bottom reference electrodes, and the two top reference electrodes.

2. The device of claim 1, wherein:
each of the three bottom electrodes is about a similar size and about a similar shape as each other of the three bottom electrodes; and
each of the three top electrodes is about a similar size and about a similar shape as each other of the three top electrodes.

3. The device of claim 2, wherein each of the three bottom electrodes is situated in alignment and registration with one of the three top electrodes.

4. The device of claim 2, wherein:
each of the three bottom electrodes is directly adjacent to two other bottom electrodes, each of the three bottom electrodes occupying 120 degrees of arc of the bottom circle; and
each of the three top electrodes is directly adjacent to two other top electrodes, each of the three top electrodes occupying 120 degrees of arc of the top circle.

5. The device of claim 1, further comprising the disk, wherein the disk is at least one of:
a dielectric material;
a semiconductor material;
thin; and
circular.

6. The device of claim 1, further comprising at least two side electrodes situated around a perimeter of the disk and about in a plane of the disk.

7. The device of claim 6, wherein the at least two side electrodes include at least four side electrodes.

8. The device of claim 6, wherein the at least two side electrodes include at least six side electrodes.

9. The device of claim 6, wherein a high frequency voltage is applied to the at least two side electrodes.

10. The device of claim 6, further comprising at least one extension of the disk for cooperating with the at least two side electrodes to induce rotation.

11. The device of claim 10, wherein a first number of the at least one extension of the disk is one less than a second number of the at least two side electrodes.

12. The device of claim 1, wherein the at least one drive circuit includes:
three control circuits for applying three voltages, each of the three voltages being applied between a top electrode and a corresponding bottom electrode, each top electrode situated opposite the corresponding bottom electrode.

13. The device of claim 12, wherein each control circuit includes a respective position sensing unit.

14. The device of claim 13, wherein each position sensing unit includes a respective voltage sensing arrangement.

15. The device of claim 13, wherein each position sensing unit includes a respective current sensing arrangement.

16. A method of levitating a disk, comprising:
applying a first plurality of voltages to three pairs of electrodes, each pair of electrodes including a top electrode and a bottom electrode, each top electrode situated above the disk and each bottom electrode situated below the disk, each top electrode situated opposite the bottom electrode of the pair of electrodes, the three top electrodes situated equidistantly around a top circle, the three bottom electrodes situated equidistantly around a bottom circle;
applying a second plurality of voltages to two bottom reference electrodes situated below the disk, a first bottom reference electrode forming a bottom inner circle radially inwards of the set of three bottom electrodes, a second bottom reference electrode forming a bottom outer circle radially outwards of the set of three bottom electrodes; and
applying a third plurality of voltages to two top reference electrodes situated above the disk, a first top reference electrode forming a top inner circle radially inwards of the set of three top electrodes, a second top reference electrode forming a top outer circle radially outwards of the set of three top electrodes.

17. The method of claim 16, wherein at least one of the first plurality of voltages, the second plurality of voltages, and the third plurality of voltages is applied by at least one drive circuit.

18. The method of claim 16, further comprising applying a fourth plurality of voltages to a plurality of side electrodes, each of the plurality of side electrodes situated about in a plane of the disk and around an outer perimeter of the disk, the fourth plurality of voltages applied in sequence to induce a rotational force on the disk.

19. The method of claim 18, wherein the fourth plurality of voltages vary at a high frequency.

20. The method of claim 18, wherein each of the plurality of side electrodes is matched with another of the plurality of side electrodes to form a side electrode pair, each driving signal of each of the plurality of side electrodes phase shifted by 180 degrees with each other drive signal of the other of the plurality of side electrodes forming the side electrode pair.

21. The method of claim 18, wherein the disk has an internal structure for cooperating with each of the plurality of side electrodes to induce the rotational force.

22. The method of claim 16, wherein at least one of the first plurality of voltages, the second plurality of voltages, and the third plurality of voltages includes at least one of high frequency dynamic voltages and static voltages, a maximum value of the at least one of the first plurality of voltages, the second plurality of voltages, and the third plurality of voltages changing to counteract at least one external force.

23. The method of claim 22, wherein the at least one external force is due to at least one of a linear acceleration and an angular acceleration.

24. The method of claim 22, wherein at least one of an acceleration, an angular acceleration, a tilt, and an angular velocity is determined by a value of at least one of the first plurality of voltages, the second plurality of voltages, and the third plurality of voltages.

25. The method of claim 22, wherein a variation of at least one of the first plurality of voltages, the second plurality of voltages, and the third plurality of voltages is used to determine a measurement signal.

26. The method of claim 16, wherein at least one of the first plurality of voltages, the second plurality of voltages, and the third plurality of voltages of voltages is varied to impart a rotational force to the disk.

27. A system, comprising:
a disk including at least one of a dielectric material and a semiconductor material, the disk about planar and about circular;
a first electrode situated below the disk;
a second electrode situated above the disk and opposite the first electrode;
a third electrode situated below the disk;
a fourth electrode situated above the disk and opposite the third electrode;

a fifth electrode situated below the disk and forming a bottom circle with the first electrode and the third electrode, the first electrode, the third electrode, and the fifth electrode situated equidistantly around the bottom circle;

a sixth electrode situated above the disk and opposite the fifth electrode and forming a top circle with the second electrode and the fourth electrode, the second electrode, the fourth electrode, and the sixth electrode situated equidistantly around the top circle;

a bottom outer reference electrode situated below the disk and forming a bottom outer circle radially outwards from the bottom circle;

a bottom inner reference electrode situated below the disk and forming a bottom outer circle radially inwards from the bottom circle;

a top outer reference electrode situated above the disk and forming a top outer circle radially outwards from the top circle;

a top inner reference electrode situated above the disk and forming a top outer circle radially inwards from the top circle; and at least one drive circuit electrically coupled to at least one of the first electrode, the second electrode, the third electrode, the fourth electrode, the fifth electrode, and the sixth electrode, the at least one drive circuit applying a plurality of voltages.

28. The system of claim 27, wherein each of the plurality of voltage is varied at a high frequency.

29. The system of claim 27, further comprising a plurality of side electrodes situated around a perimeter of the disk and about in a plane of the disk, a high frequency voltage applied to the plurality of side electrodes to induce a rotation of the disk.

30. The system of claim 27, wherein the disk includes the dielectric material covered on a top and a bottom by conducting material.

* * * * *

UNITED STATES PATENT AND TRADEMARK OFFICE
CERTIFICATE OF CORRECTION

PATENT NO.    : 6,856,067 B2
DATED         : February 15, 2005
INVENTOR(S)   : Frey et al.

It is certified that error appears in the above-identified patent and that said Letters Patent is hereby corrected as shown below:

<u>Column 10,</u>
Line 56, change "plurality of voltages of voltages" to -- plurality of voltages --.

Signed and Sealed this

First Day of November, 2005

JON W. DUDAS
*Director of the United States Patent and Trademark Office*